(12) United States Patent
South (10) Patent No.: US 11,684,875 B2
(45) Date of Patent: Jun. 27, 2023

(54) CHAMBERED PARALLEL FLOW DUAL FILTER

(71) Applicant: Cummins Filtration IP, Inc., Columbus, IN (US)

(72) Inventor: Kevin C. South, Cookeville, TN (US)

(73) Assignee: CUMMINS FILTRATION IP, INC., Columbus, IN (US)

(\*) Notice: Subject to any disclaimer, the term of this patent is extended or adjusted under 35 U.S.C. 154(b) by 151 days.

(21) Appl. No.: 17/044,369

(22) PCT Filed: Apr. 11, 2019

(86) PCT No.: PCT/US2019/026945
§ 371 (c)(1),
(2) Date: Oct. 1, 2020

(87) PCT Pub. No.: WO2019/200068
PCT Pub. Date: Oct. 17, 2019

(65) Prior Publication Data
US 2021/0093988 A1    Apr. 1, 2021

Related U.S. Application Data

(60) Provisional application No. 62/656,524, filed on Apr. 12, 2018.

(51) Int. Cl.
*B01D 29/52* (2006.01)
*B01D 29/15* (2006.01)
(Continued)

(52) U.S. Cl.
CPC .............. *B01D 29/52* (2013.01); *B01D 29/15* (2013.01); *B01D 29/23* (2013.01); *B01D 35/30* (2013.01);
(Continued)

(58) Field of Classification Search
CPC ........ B01D 29/52; B01D 29/15; B01D 29/23; B01D 35/30; B01D 2201/298;
(Continued)

(56) References Cited

U.S. PATENT DOCUMENTS 3,216,571 A    11/1965  Whiting et al.
3,370,708 A    2/1968   Hultgren et al.
(Continued)

FOREIGN PATENT DOCUMENTS

CN    88101118 A     8/1988
CN    101352624     1/2009
(Continued)

OTHER PUBLICATIONS

Office Action issue for Chinese Office Action No. CN 2019800251142 dated Aug. 23, 2021, 16 pages.
(Continued)

*Primary Examiner* — Madeline Gonzalez
(74) *Attorney, Agent, or Firm* — Foley & Lardner LLP (57) ABSTRACT

A filter assembly including a filter housing having a longitudinal axis, the filter housing divided into a first filter chamber and a second filter chamber. The filter assembly further includes a first filter element and a second filter element. The first filter element includes a first element top endplate, a first element bottom endplate, and a first filter media positioned between the first element top endplate and the first element bottom endplate. The second filter element includes a second element top endplate, a second element bottom endplate, and a second filter media positioned between the second element top endplate and the second element bottom endplate. The filter assembly further includes a solid tube positioned between the first element top endplate and the second element bottom endplate.

7 Claims, 8 Drawing Sheets

(51) Int. Cl.
B01D 29/23 (2006.01)
B01D 35/30 (2006.01)
F02M 37/34 (2019.01)

(52) U.S. Cl.
CPC .. *B01D 2201/298* (2013.01); *B01D 2201/342* (2013.01); *B01D 2201/347* (2013.01); *F02M 37/34* (2019.01)

(58) Field of Classification Search
CPC ........ B01D 2201/342; B01D 2201/347; B01D 29/54; F02M 37/34
USPC ...... 210/323.2, 450, 493.2, 195.1, 200, 252, 210/253, 314, 337, 455, 488, 489, 210/DIG. 13, 342, 315, 338, 437, 457, 210/458
See application file for complete search history.

(56) References Cited

U.S. PATENT DOCUMENTS

| | | | |
|---|---|---|---|
| 3,487,929 | A | 1/1970 | Sampet et al. |
| 5,520,801 | A * | 5/1996 | Gerber ................. B01D 35/147 210/450 |
| 6,206,090 | B1 | 3/2001 | Rago |
| 2006/0191832 | A1 | 8/2006 | Richie et al. |
| 2006/0191836 | A1 | 8/2006 | Dworatzek et al. |
| 2010/0140155 | A1 | 6/2010 | Gift et al. |
| 2012/0037556 | A1 | 2/2012 | Beard et al. |
| 2015/0209699 | A1 | 7/2015 | Morris et al. |
| 2015/0336034 | A1 | 11/2015 | Carrion |
| 2016/0228803 | A1 | 8/2016 | Hubbard |

FOREIGN PATENT DOCUMENTS

| | | |
|---|---|---|
| CN | 101578127 | 11/2009 |
| CN | 102281934 | 12/2011 |
| CN | 105080207 | 11/2015 |
| CN | 106536914 | 3/2017 |
| DE | 31 03 723 A1 | 9/1982 |
| DE | 4322894 | 1/1995 |
| DE | 10 2007 014 813 A1 | 10/2008 |
| EP | 1 183 088 | 3/2002 |

OTHER PUBLICATIONS

Search Report issued for European Patent Application No. EP 19785088.6, dated Jan. 27, 2022, 15 pages.
International Search Report and Written Opinion issued for PCT/US2019/026945, dated Jun. 26, 2019, 14 pages.
Extended Search Report issued for European Patent Application No. 3153135.1 dated Mar. 15, 2023, 9 pages.

* cited by examiner

CHAMBERED PARALLEL FLOW DUAL FILTER

CROSS REFERENCE TO RELATED APPLICATION

This application is a National Stage of PCT Application No. PCT/US2019/026945, filed Apr. 11, 2019, which claims priority to U.S. Provisional Patent Application No. 62/656,524, filed on Apr. 12, 2018. The contents of these applications are hereby incorporated by reference in their entirety.

TECHNICAL FIELD

The present disclosure relates generally to filtration systems for use with internal combustion engine systems or the like.

BACKGROUND

Internal combustion engines generally combust a mixture of fuel (e.g., gasoline, diesel, natural gas, etc.) and air. Fluids passing through the internal combustion engine are filtered to remove particulate and contaminants from the fluids prior to entering the internal combustion engine and/or from fluids exiting the internal combustion engine. For example, prior to entering the engine, fuel to be combusted is typically passed through a filter element to remove contaminants (e.g., particulates, dust, water, etc.) from the fuel prior to delivery to the engine. The filter media of the filter element captures and removes particulate from the fuel passing through the filter media. The availability of space on the engine may be very limited and, in particular, can be limited when extended service intervals are required due to the size and number of filter elements used in the engine.

SUMMARY

Various example embodiments relate to a filter assembly including a filter housing having a longitudinal axis, the filter housing divided into a first filter chamber and a second filter chamber. The filter assembly further includes a first filter element and a second filter element. The first filter element includes a first element top endplate, a first element bottom endplate, and a first filter media positioned between the first element top endplate and the first element bottom endplate. The second filter element includes a second element top endplate, a second element bottom endplate, and a second filter media positioned between the second element top endplate and the second element bottom endplate. The filter assembly further includes a solid tube positioned between and coupled to the first element top endplate and the second element bottom endplate.

Another example embodiment relates to a filter assembly including a filter housing having a longitudinal axis, the filter housing divided into a first filter chamber and a second filter chamber. The filter assembly further includes a top endplate comprising a top aperture, a bottom endplate comprising a bottom aperture, a first filter media, and a second filter media. The first filter media is positioned between the top endplate and the bottom endplate and on a first side of the top aperture and the bottom aperture. The second filter media is positioned between the top endplate and the bottom endplate and on a second side of the top aperture and the bottom aperture. The filter assembly further includes a solid tube positioned between and coupled to the top endplate and the bottom endplate.

Another example embodiment relates to a filter assembly including a filter housing having a longitudinal axis, the filter housing divided into a first filter chamber and a second filter chamber. The filter assembly further includes a first top endplate, a second top endplate, and a bottom endplate. The filter assembly further includes a first filter media positioned between the first top endplate and the bottom endplate. The filter assembly further includes a second filter media positioned between the second top endplate and the bottom endplate.

Yet another example embodiment relates to a filter element including a top endplate including a top aperture, a bottom endplate including a bottom aperture, a first filter media positioned between the top endplate and the bottom endplate and on a first side of the top aperture and the bottom aperture, a second filter media positioned between the top endplate and the bottom endplate and on a second side of the top aperture and the bottom aperture, and a solid tube positioned between and coupled to the top endplate and the bottom endplate.

Still another example embodiment relates to a filter element including a first top endplate, a second top endplate, a bottom endplate, a first filter media positioned between the first top endplate and the bottom endplate, and a second filter media positioned between the second top endplate and the bottom endplate.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1A:
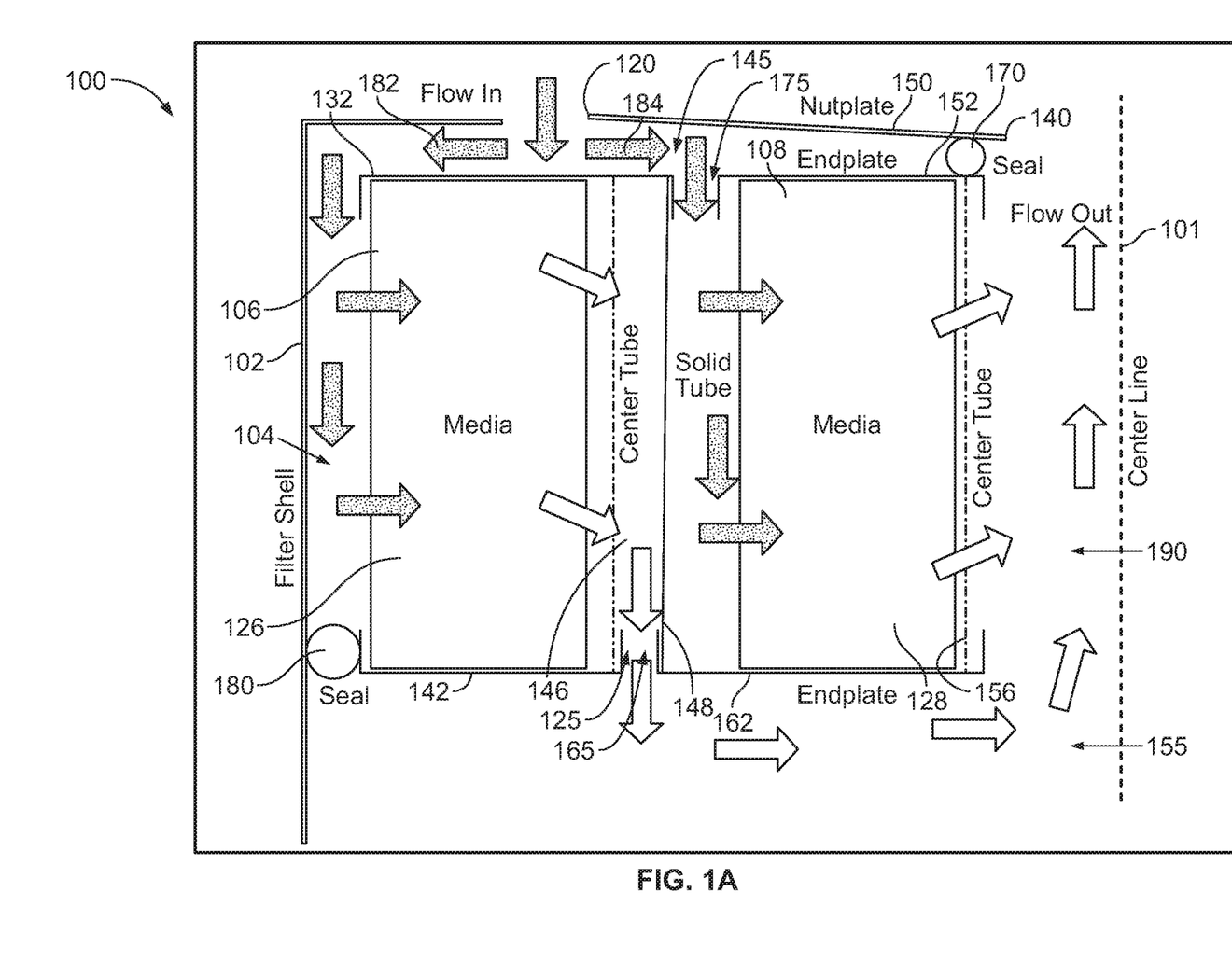
FIG. 1A shows a schematic view of a filter assembly according to an example embodiment.

Referring to the figures generally, a filter assembly configured to filter fluid prior to entering into an engine is shown. Referring to FIG. 1A, a filter assembly is shown according to an example embodiment. The filter assembly 100 filters fluid such as fuel prior to use in an internal combustion engine. In another embodiment, the filter assembly 100 filters fluid such as oil exiting an internal combustion engine. The filter assembly 100 includes a filter housing 102 extending along a longitudinal axis 101 having an internal cavity 104, a first filter element 106, and a second filter element 108. The filter assembly 100 includes a nut plate 150. The nut plate 150 couples (e.g., fastens, threads) the filter assembly 100 to a mounting head on the engine.

As shown in FIG. 1A, the first filter element 106 and the second filter element 108 are positioned within the internal cavity 104 of the filter housing 102. The first filter element 106 and second filter element 108 are cylindrical filter elements. The first filter element 106 is positioned radially outward from the second filter element 108 relative to the longitudinal axis 101 of the filter housing 102. In some embodiments, the first filter element 106 and the second filter element 108 are part of a single combined filter insert configured to be inserted into the filter housing 102 as a single piece during assembly. In other embodiments, the first filter element 106 and the second filter element 108 are otherwise assembled (e.g., separately assembled) into the filter housing 102. In some embodiments, more than two filter elements are included with the filter assembly 100.

The first filter element 106 includes first filter media 126 configured to filter a fluid. The first filter media 126 defines an inner space 125. The first filter media 126 comprises a particulate filter for removing particulates from a fluid stream. A first center tube 146 is positioned within the inner space 125 of the first filter media 126 radially between the first filter element 106 and the second filter element 108. The first center tube 146 is configured to support the first filter media 126 and to allow fluid flow through the first filter media 126. The first center tube 146 may be formed from plastic, metals or any other suitable material. The first filter media 126 is positioned between a first element top endplate 132 and a first element bottom endplate 142. The first filter media 126 is potted or embedded with the first element top endplate 132 on one axial end and potted or embedded with the first element bottom endplate 142 at the opposite axial end.

The second filter element 108 includes second filter media 128 configured to filter a fluid. The second filter media 128 is positioned between a second element top endplate 152 and a second element bottom endplate 162. The second filter media 128 is potted or embedded with the second element top endplate 152 at one axial end and potted or embedded with the second element bottom endplate 162 at an opposite axial end. In some embodiments, the first element top endplate 132 and the second element top endplate 152 are formed as a single top endplate with a flow hole or aperture defined therebetween to separate the flow of fluid. In some embodiments, the first element bottom endplate 142 and the second element bottom endplate 162 are also formed as a single bottom endplate with a flow hole or aperture defined therebetween to separate the flow of fluid.

Still referring to FIG. 1A, an axial seal member 170 is positioned between the second element top endplate 152 and the nut plate 150. The axial seal member 170 is configured to seal the second element top endplate 152 to an inner surface of the nut plate 150. The filter assembly 100 also includes a radial seal member 180 positioned between the first element bottom endplate 142 and the filter housing 102. The radial seal member 180 is configured to seal the first element bottom endplate 142 to the inner wall of the filter housing 102. Accordingly, the axial seal member 170 and the radial seal member 180 divide the internal cavity 104 into a first filter chamber 145 (e.g., a dirty fluid chamber) and a second filter chamber 155 (e.g., a clean fluid chamber). In various arrangements, the sealing members 170, 180 comprise sealing gaskets (e.g., O-rings). In other embodiments, the sealing members 170, 180 may comprise other types of sealing features. In various embodiments, the sealing members described herein can be axial or radial, lathe-cut, can comprise an O-ring, or can be molded to a specific shape. In some arrangements, no sealing members are included and instead, a seal is formed between various components described herein by spin-welding the components together. In other arrangements, a seal between components can be formed by threading the components together. A center passageway 190 is formed along the longitudinal axis 101 of the filter housing 102. Fluids from the first filter chamber 145 flow through either the first filter media 126 or the second filter media 128 into the center passageway 190 and toward the fluid outlet 140.

A solid tube 148 is positioned between the first filter media 126 and the second filter media 128. The solid tube 148 is potted or embedded with the first element top endplate 132 at one axial end and potted or embedded with the second element bottom endplate 162 at an opposite axial end. A first passageway 165 is formed between the solid tube 148 and the first filter media 126, and a second passageway 175 is formed between the solid tube 148 and the second filter media 128. As shown in FIG. 1A, the positioning of the solid tube 148 forms offset passageways (e.g., first passageway 165 and second passageway 175), where the passageways are radially offset from each other (e.g., first passageway 165 is positioned further from longitudinal axis 101 than the second passageway 175). In conjunction with the axial seal member 170 and the radial seal member 180, the solid tube 148 divides the internal cavity 104 of the filter housing 102 into the first filter chamber 145 and the second filter chamber 155.

The filter housing 102 and the nut plate 150 form a fluid inlet 120 configured to supply fluid to the first filter chamber 145 to be filtered from, for example, a fuel tank (not shown). As shown in FIG. 1A, fluid to be filtered by the filter assembly flows through fluid inlet 120 and either toward or away from the longitudinal axis 101 to be filtered by one of the first filter element 106 and the second filter element 108. Fluid flowing away from the longitudinal axis 101 (e.g., flowing along flow path 182) flows into the first filter chamber 145 via the fluid inlet 120, downward along the inner wall of the filter housing 102 and radially inward through the first filter media 126 into the first center tube 146 of the second filter chamber 155. The fluid flows down through the first center tube 146 via first passageway 165 and around the outside of the second element bottom endplate 162 toward the longitudinal axis 101 and exits the filter assembly 100 through the fluid outlet 140. Fluid flowing toward the longitudinal axis 101 (e.g., flowing along flow path 184) flows into the first filter chamber 145 via the fluid inlet 120, past the solid tube 148 in between the first filter element 106 and second filter element 108 through second passageway 175 and radially inward through the second filter media 128. The fluid then flows into the second center tube 156 of the second filter chamber 155 and exits the filter assembly 100 through the fluid outlet 140.

Figure 1B:
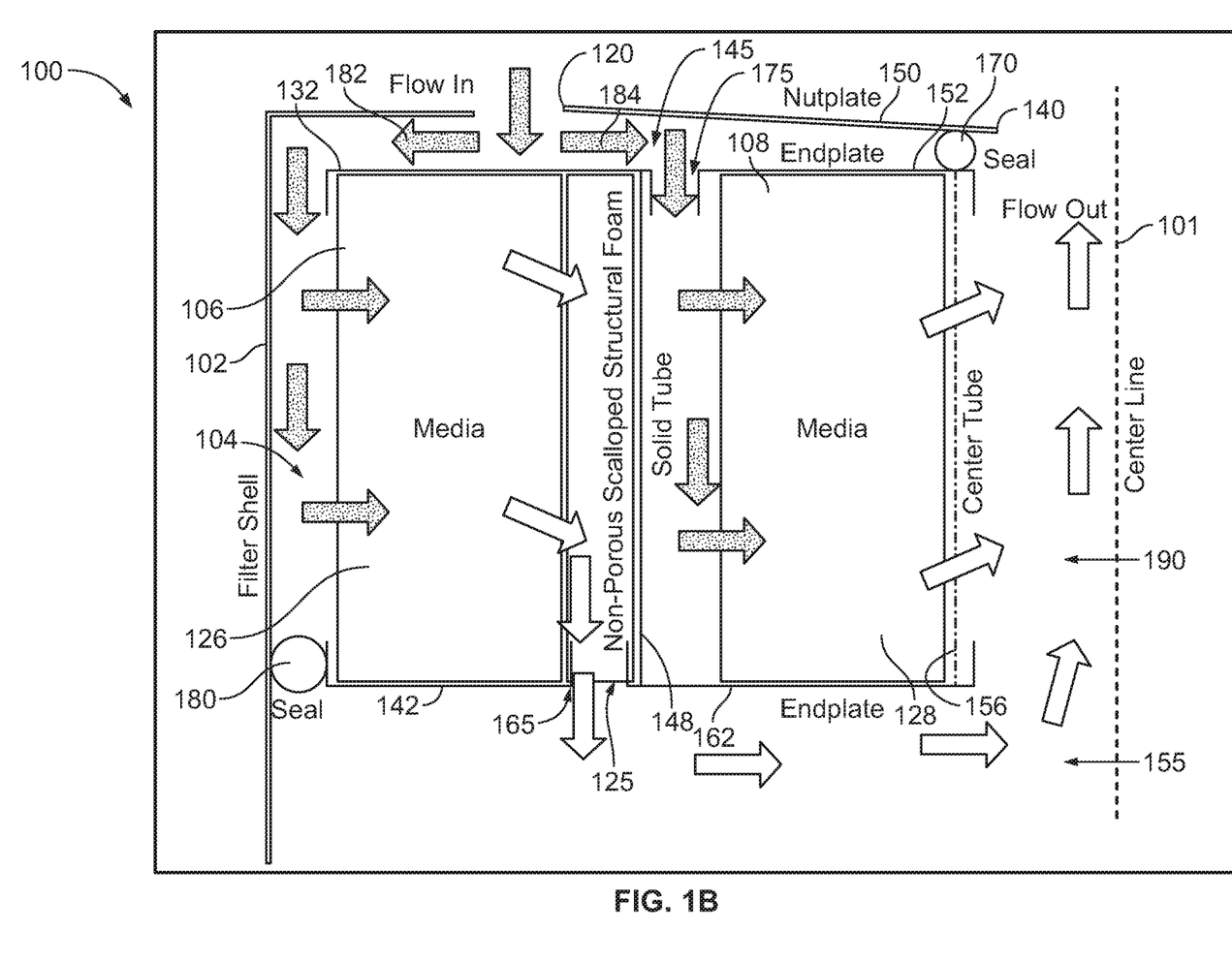
FIG. 1B shows a schematic view of the filter assembly of FIG. 1A according to another embodiment.

Referring to FIG. 1B, in another embodiment, foam structure 151 is included between the first filter media 126 and the solid tube 148. The foam structure 151 is a non-porous scalloped structural foam. The foam structure 151 includes twisted scallops to allow fluid flow to escape the structure 151. In some embodiments, the foam structure is porous. In some embodiments, the foam structure 151 is not scalloped and instead includes a non-smooth outer surface to allow for the fluid flow to escape on the clean side of the filter. Fluid flows through the first filter media 126 around the foam structure 151 via first passageway 165 and around the outside of the second element bottom endplate 162 toward the longitudinal axis 101 and exits the filter assembly 100 through fluid outlet 140.

Figure 2:
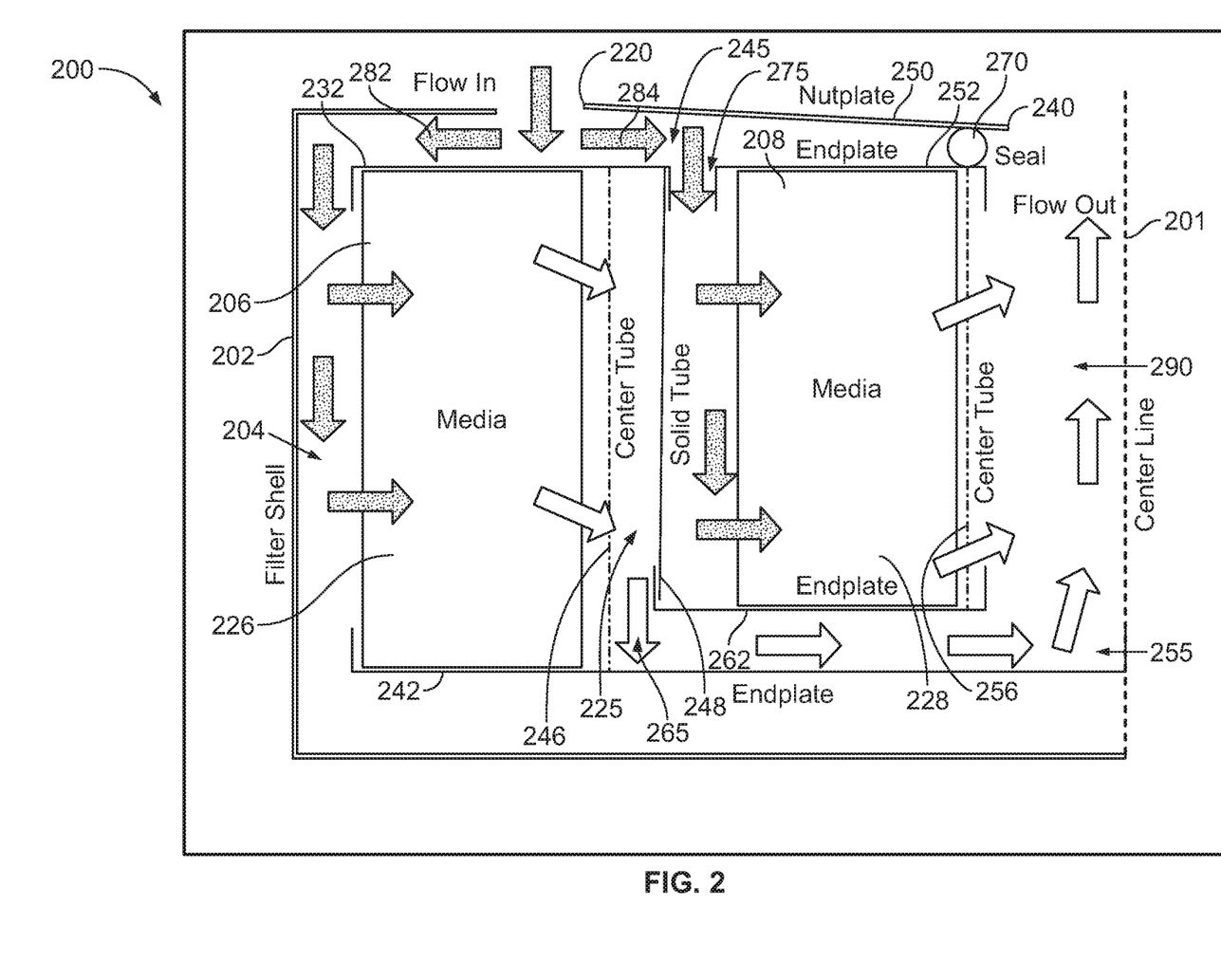
FIG. 2 shows a schematic view of a filter assembly according to another embodiment.

Referring to FIG. 2, a filter assembly is shown according to another example embodiment. The filter assembly 200 filters fluid such as fuel prior to use in an internal combustion engine. In another embodiment, the filter assembly 200 filters fluid such as oil exiting an internal combustion engine. The filter assembly 200 includes a filter housing 202 extending along a longitudinal axis 201 having an internal cavity 204, a first filter element 206, and a second filter element 208. The filter assembly 200 includes a nut plate 250. The nut plate 250 couples (e.g., fastens, threads) the filter assembly 200 to a mounting head on the engine.

As shown in FIG. 2, the first filter element 206 and the second filter element 208 are positioned within the internal cavity 204 of the filter housing 202. The first filter element 206 and second filter element 208 are cylindrical filter elements. The first filter element 206 is positioned radially outward from the second filter element 208 relative to the longitudinal axis 201 of the filter housing 202. In some embodiments, the first filter element 206 and the second filter element 208 are part of a single combined filter insert configured to be inserted into the filter housing 202 as a single piece during assembly. In other embodiments, the first filter element 206 and the second filter element 208 are otherwise assembled (e.g., separately assembled) into the filter housing 202. In some embodiments, more than two filter elements are included with the filter assembly 200.

The first filter element 206 includes first filter media 226 configured to filter a fluid. The first filter media 226 comprises a particulate filter for removing particulates from a fluid stream. The first filter media 226 defines an inner space 225. A first center tube 246 is positioned within the inner space 225 of the first filter media 226 radially between the first filter element 206 and the second filter element 208. The first center tube 246 is configured to support the first filter media 226 and to allow fluid flow through the first filter media 226. The first center tube 246 may be formed from plastic, metals or any other suitable material. The first filter media 226 is positioned between a first element top endplate 232 and a first element bottom endplate 242. The first filter media 226 is potted or embedded with the first element top endplate 232 on one axial end and potted or embedded with the first element bottom endplate 242 at the opposite axial end.

The second filter element 208 includes second filter media 228 configured to filter a fluid. The second filter media 228 is positioned between a second element top endplate 252 and a second element bottom endplate 262. The second filter media 228 is potted or embedded with the second element top endplate 252 at one axial end and potted or embedded with the second element bottom endplate 262 at an opposite axial end. The first element bottom endplate 242 extends radially across the filter housing 202 such that the first element bottom endplate 242 is positioned axially below the second element bottom endplate 262 (e.g., first element bottom endplate 242 is positioned further from the second element top endplate 252 than the second element bottom endplate 262). In embodiments where the first element bottom endplate 242 extends radially across the filter housing 202, a radial seal (e.g., the radial seal member 180 shown in FIG. 1) is not needed. In other embodiments, such as shown in FIG. 1, the first element bottom endplate 242 does not extend to the longitudinal axis 201. In some embodiments, the first element top endplate 232 and the second element top endplate 252 are formed as a single top endplate with a flow hole or aperture defined therebetween to separate the flow of fluid. In some embodiments, the first element bottom endplate 242 and the second element bottom endplate 262 are also formed as a single bottom endplate with a flow hole or aperture defined therebetween to separate the flow of fluid.

Still referring to FIG. 2, an axial seal member 270 is positioned between the second element top endplate 252 and the nut plate 250. The axial seal member 270 is configured to seal the second element top endplate 252 to an inner surface of the nut plate 250. Accordingly, the axial seal member 270 divides the internal cavity 204 into a first filter chamber 245 (e.g., a dirty fluid chamber) and a second filter chamber 255 (e.g., a clean fluid chamber). In various arrangements, the axial seal member 270 comprises a sealing gasket (e.g., O-ring). In other embodiments, the axial seal member 270 may comprise other types of sealing features. In various embodiments, the sealing members described herein can be axial or radial, lathe-cut, can comprise an O-ring, or can be molded to a specific shape. In some arrangements, no sealing members are included and instead, a seal is formed between various components described herein by spin-welding the components together. In other arrangements, a seal between components can be formed by threading the components together. A center passageway 290 is formed along the longitudinal axis 201 of the filter housing 202. Fluids from the first filter chamber 245 flow through either the first filter media 226 or the second filter media 228 into the center passageway 290 and toward the fluid outlet 240.

A solid tube 248 is positioned between the first filter media 226 and the second filter media 228. The solid tube 248 is potted or embedded with the first element top endplate 232 on one axial end and potted or embedded with the second element bottom endplate 262 on an opposite axial end. A first passageway 265 is formed between the solid tube 248 and the first filter media 226 and a second passageway 275 is formed between the solid tube 248 and the second filter media 228. As shown in FIG. 1, the positioning of the solid tube 248 forms offset passageways (e.g., first passageway 265 and second passageway 275), where the passageways are radially offset from each other (e.g., first passageway 265 is positioned further from longitudinal axis 201 than the second passageway 275). In conjunction with the axial seal member 270, the solid tube 248 divides the internal cavity 204 of the filter housing 202 into the first filter chamber 245 and the second filter chamber 255.

The filter housing 202 and nut plate 250 form a fluid inlet 220 configured to supply fluid to the first filter chamber 245 to be filtered from, for example, a fuel tank (not shown). As shown in FIG. 2, fluid to be filtered by the filter assembly flows through fluid inlet 220 and either toward or away from the longitudinal axis 201 to be filtered by one of the first filter element 206 and the second filter element 208. Fluid flowing away from the longitudinal axis 201 (e.g., flowing along flow path 282) flows into the first filter chamber 245 via the fluid inlet 220, downward along the inner wall of the filter housing 202 and radially inward through the first filter media 226 into the first center tube 246 of the second filter chamber 255. The fluid flows down through the first center tube 246 via first passageway 265 and around the underside of the second element bottom endplate 262 toward the longitudinal axis 201 and exits the filter assembly 200 through the fluid outlet 240. Fluid flowing toward the longitudinal axis 201 (e.g., flowing along flow path 284) flows into the first filter chamber 245 via the fluid inlet 220, past the solid tube 248 in between the first filter element 206 and the second filter element 208 into second passageway 275 and radially inward through the second filter media 228. The fluid then flows into the second center tube 256 of the second filter chamber 255 and exits the filter assembly 200 through the fluid outlet 240.

Figure 3:
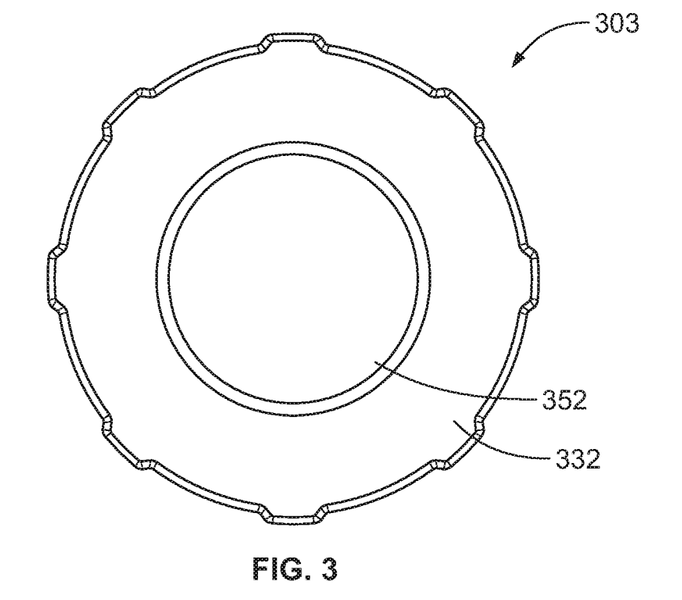
FIG. 3 shows separate endplates for use with the filter assemblies of FIGS. 1A-2.
Figure 4:
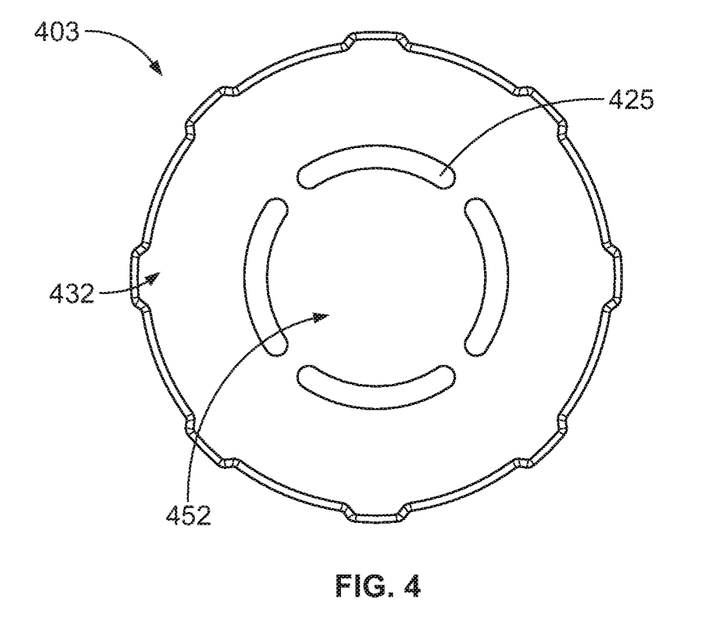
FIG. 4 shows integral endplates for use with the filter assemblies of FIGS. 1A-2.

Referring to FIG. 3, in some embodiments, the first and second element top endplates (e.g., first element top endplate 332, second element top endplate 352) are formed as separate endplates. In some embodiments, the first and second bottom (e.g., first element bottom endplate, second element bottom endplate) (similar in appearance to the first and second element top endplates) are also formed as separate endplates. Referring to FIG. 4, in alternative embodiments, the first and second element top endplates are integrally formed as a single endplate 403. The single endplate 403 includes a first element top endplate portion 432 integrally formed with a second element top endplate portion 452 with flow apertures 425 formed therebetween. Furthermore, in some embodiments, the first element bottom endplate and the second element bottom endplate may integrally formed as a single endplate having a first element bottom endplate portion and second element bottom endplate portion are integrally formed with flow apertures formed therebetween (in a manner similar to the single endplate 403).

Figure 5:
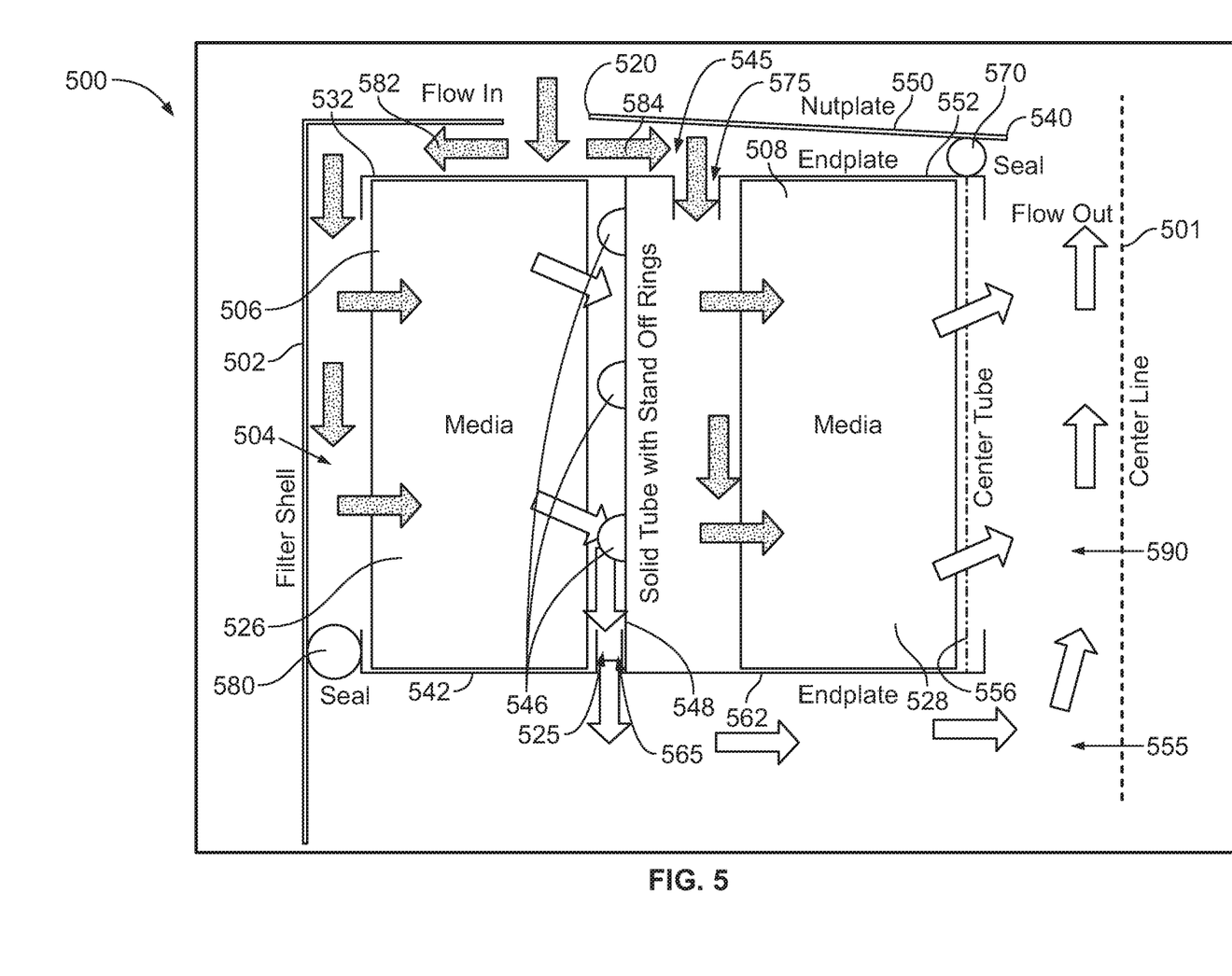
FIG. 5 shows a schematic view of a filter assembly according to another embodiment.

Referring to FIG. 5, a filter assembly is shown according to another example embodiment. The filter assembly 500 includes all of the same components of the filter assembly of FIG. 1A except that no center tube (e.g., center tube 146 of FIG. 1A) is included. Instead, the solid tube 548, which is positioned between the first filter media 526 and the second filter media 528, includes stand-off rings 546. The stand-off rings 546 protrude from the solid tube 548 radially outward from the longitudinal axis 501 (e.g., perpendicular to the surface of the solid tube 548). In some embodiments, the stand-off rings 546 are concentric or spiral-shaped, like a spring. In some embodiments, concentric stand-off rings can be solid or slotted. The stand-off rings can be formed as part of the solid tube 548 or be a separate component. A first passageway 565 is formed between the solid tube 548 and the first filter media 526, and a second passageway 575 is formed between the solid tube 548 and the second filter media 528. The stand-off rings 546 extend into the first passageway 565. As shown in FIG. 5, the positioning of the solid tube 548 forms offset passageways (e.g., first passageway 565 and second passageway 575), where the passageways are radially offset from each other (e.g., first passageway 565 is positioned further from longitudinal axis 501 than the second passageway 575). In conjunction with the axial seal member 570 and the radial seal member 580, the solid tube 548 divides the internal cavity 504 of the filter housing 502 into the first filter chamber 545 and the second filter chamber 555. Accordingly, fluid flowing away from the longitudinal axis 501 (e.g., flowing along flow path 582) flows into the first filter chamber 545 via the fluid inlet 520, downward along the inner wall of the filter housing 502 and radially inward through the first filter media 526 into the first passageway 565 defined by the solid tube 548 with stand-off rings 546 and the first filter media 526. The fluid flows down through the first passageway 565 and around the outside of the second element bottom endplate 562 toward the longitudinal axis 501 and exits the filter assembly 500 through the fluid outlet 540.

Figure 6:
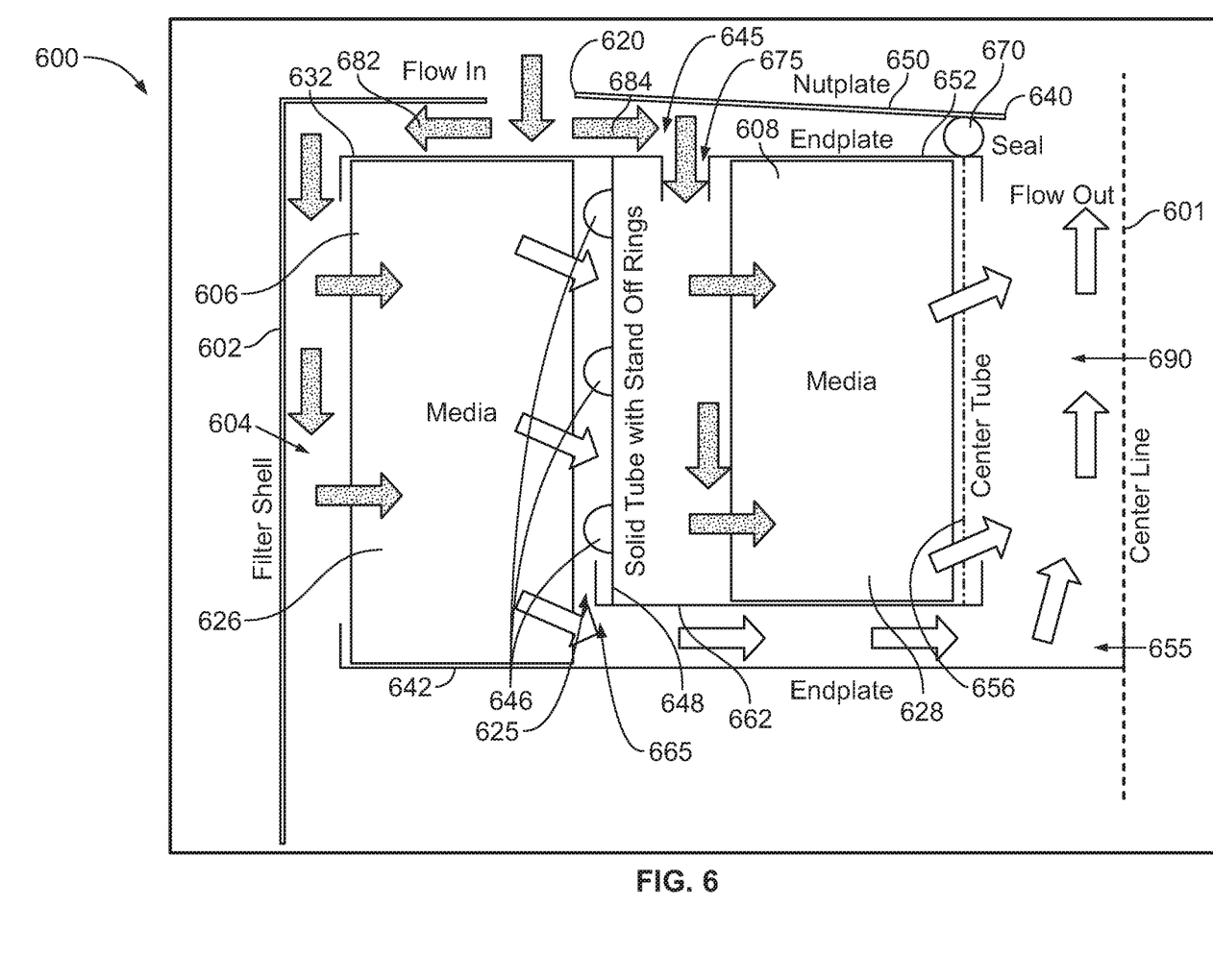
FIG. 6 shows a schematic view of a filter assembly according to still another embodiment.

Referring to FIG. 6, a filter assembly is shown according to still another example embodiment. The filter assembly 600 includes the same components of the filter assembly of FIG. 2, except that no center tube (e.g., center tube 246 of FIG. 2) is included. Instead, the solid tube 648, which is positioned between the first filter media 626 and the second filter media 628, includes stand-off rings 646. The stand-off rings 646 protrude from the solid tube 648 radially outward from the longitudinal axis 601 (e.g., perpendicular to the surface of the solid tube 648). A first passageway 665 is formed between the solid tube 648 and the first filter media 626, and a second passageway 675 is formed between the solid tube 648 and the second filter media 628. The stand-off rings 646 extend into the first passageway 665. As shown in FIG. 6, the positioning of the solid tube 648 forms offset passageways (e.g., first passageway 665 and second passageway 675), where the passageways are radially offset from each other (e.g., first passageway 665 is positioned further from longitudinal axis 601 than the second passageway 675). In conjunction with the axial seal member 670, the solid tube 648 divides the internal cavity 604 of the filter housing 602 into the first filter chamber 645 and the second filter chamber 655. Accordingly, fluid flowing away from the longitudinal axis 601 (e.g., flowing along flow path 682) flows into the first filter chamber 645 via the fluid inlet 620, downward along the inner wall of the filter housing 602 and radially inward through the first filter media 626 into the first passageway 665 defined by the solid tube 648 with stand-off rings 646 and the first filter media 626. The fluid flows down through the first passageway 665 and around the underside of the second element bottom endplate 662 toward the longitudinal axis 601 and exits the filter assembly 600 through the fluid outlet 640.

Figure 7:
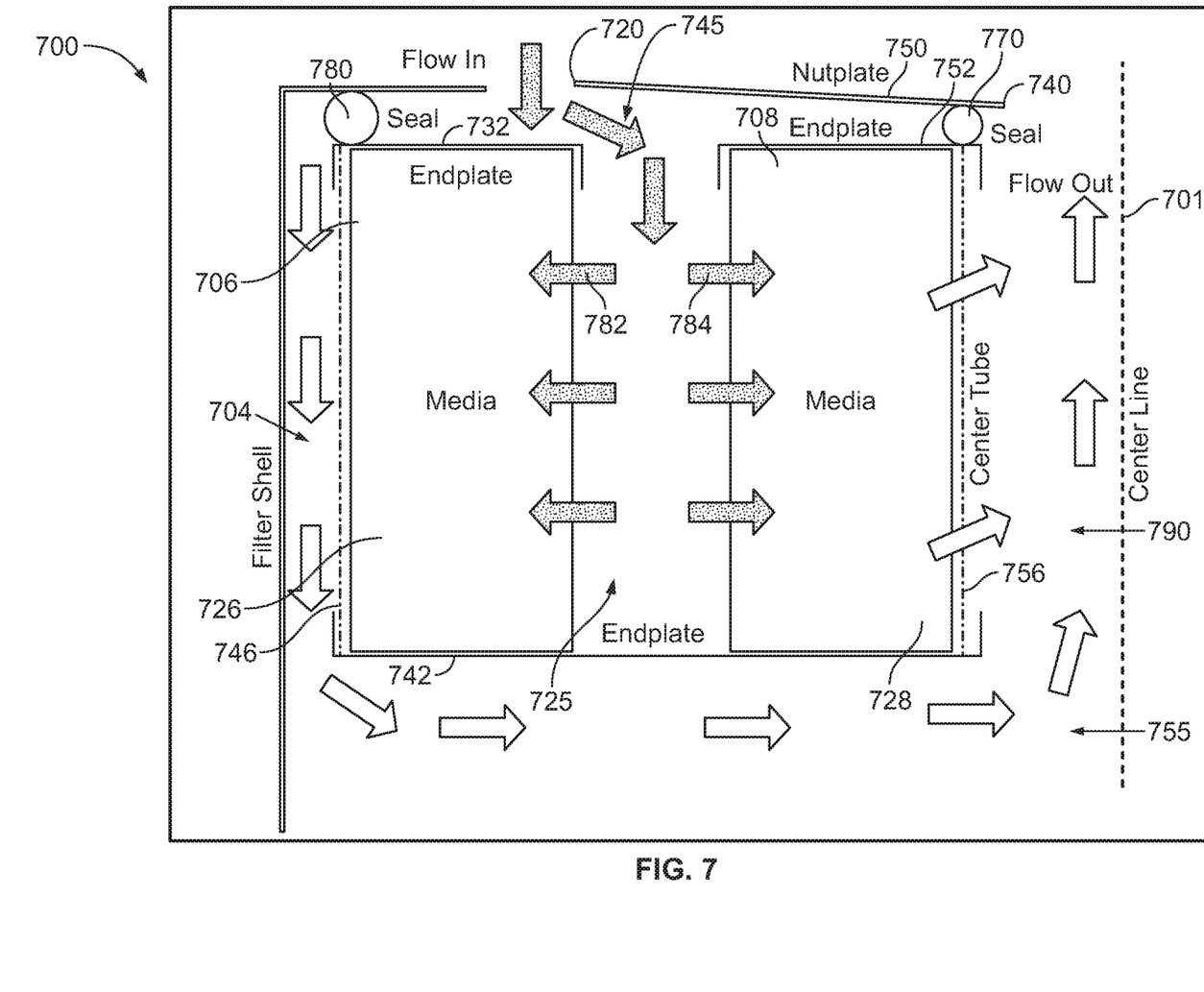
FIG. 7 shows a schematic view of a filter assembly according to yet another embodiment.

Referring to FIG. 7, a filter assembly is shown according to still another example embodiment. The filter assembly 700 includes a filter housing 702 extending along a longitudinal axis 701 having an internal cavity 704, a first filter element 706, and a second filter element 708. The filter assembly 700 includes a nut plate 750. The first filter element 706 includes first filter media 726 and the second filter element 708 includes second filter media 728 both configured to filter a fluid. The first filter media 726 and the second filter media 728 define an inner space 725 therebetween. A first center tube 746 is positioned at an outer diameter of the first filter media 726 (e.g., radially outward of the first filter media 726 from the longitudinal axis 701). The first center tube 746 is configured to support the first filter media 726 and to allow fluid flow through the first filter media 726. The first filter media 726 is positioned between a first element top endplate 732 and a bottom endplate 742. The first filter media 226 is potted or embedded with the first element top endplate 732 on one axial end and potted or embedded with the first element bottom endplate 742 at the opposite axial end. The second filter media 728 is positioned between a second element top endplate 752 and the bottom endplate 742. Accordingly, the second filter media 728 is potted or embedded with the second element top endplate 752 at one axial end and potted or embedded with the bottom endplate 742 at an opposite axial end. A second center tube 756 is positioned at an inner diameter of the second filter media 728 (e.g., radially inward of the second filter media 728 relative to the longitudinal axis 701). The second center tube 756 is configured to support the second filter media 728 and to allow fluid flow through the first filter media 728.

Still referring to FIG. 7, a first axial seal member 780 is positioned between the first element top endplate 732 and the filter housing 702 and a second axial seal member 780 is positioned between the second element top endplate 752 and the nut plate 750. The first and second axial seal members 780, 770 divide the internal cavity 704 into a first filter chamber 745 (e.g., a dirty fluid chamber) and a second filter chamber 755 (e.g., a clean fluid chamber). In various embodiments, the sealing members described herein can be axial or radial, lathe-cut, O-ring, or molded to a specific shape. In some arrangements, no sealing members are included and instead, a seal is formed between various components described herein by spin-welding the components together. In other arrangements, a seal between components can be formed by threading the components together. A center passageway 790 is formed along the longitudinal axis 701 of the filter housing 702. Fluids from the fluid inlet 720 flow into the inner space 725 and through either the first filter media 726 (e.g., flowing along flow path 782) or the second filter media 728 (e.g., flowing along flow path 784) into the center passageway 790 and toward the fluid outlet 740.

Figure 8:
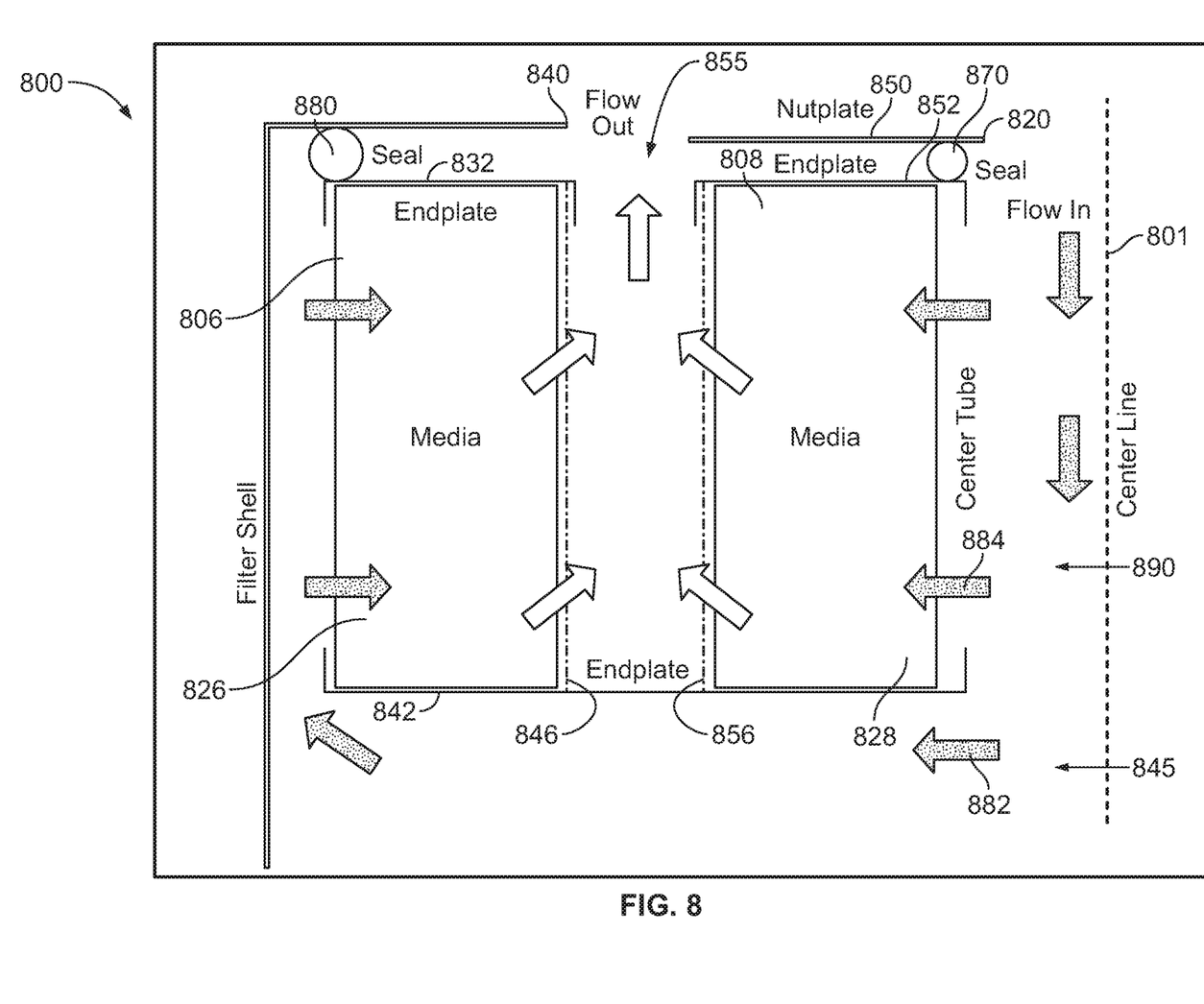
FIG. 8 shows a schematic view of a filter assembly according to another embodiment.

Referring to FIG. 8, a filter assembly is shown according to another example embodiment. The filter assembly 800 includes a filter housing 802 extending along a longitudinal axis 801 having an internal cavity 804, a first filter element 806, and a second filter element 808. The filter assembly 800 includes a nut plate 850. The first filter element 806 includes first filter media 826 and the second filter element 808 includes second filter media 828 both configured to filter a fluid. The first filter media 826 and the second filter media 828 define an inner space 825 therebetween. A first center tube 846 is positioned at an inner diameter of the first filter media 826 (e.g., radially inward of the first filter media 826 relative to the longitudinal axis 801). The first center tube 846 is configured to support the first filter media 826 and to allow fluid flow through the first filter media 826. The first filter media 826 is positioned between a first element top endplate 832 and a bottom endplate 842. The first filter media 826 is potted or embedded with the first element top endplate 832 on one axial end and potted or embedded with the first element bottom endplate 842 at the opposite axial end. The second filter media 828 is positioned between a second element top endplate 852 and the bottom endplate 842. Accordingly, the second filter media 828 is potted or embedded with the second element top endplate 852 at one axial end and potted or embedded with the bottom endplate 842 at an opposite axial end. A second center tube 856 is positioned at an outer diameter of the second filter media 828 (e.g., radially outward of the second filter media 828 from the longitudinal axis 801).

Still referring to FIG. 8, a first axial seal member 880 is positioned between the first element top endplate 832 and the filter housing 802 and a second axial seal member 880 is positioned between the second element top endplate 852 and the nut plate 850. The first and second axial seal members 880, 870 divide the internal cavity 804 into a first filter chamber 845 (e.g., a dirty fluid chamber) and a second filter chamber 855 (e.g., a clean fluid chamber). In various embodiments, the sealing members described herein can be axial or radial, lathe-cut, O-ring, or molded to a specific shape. In some arrangements, no sealing members are included and instead, a seal is formed between various components described herein by spin-welding the components together. In other arrangements, a seal between components can be formed by threading the components together. A center passageway 890 is formed along the longitudinal axis 801 of the filter housing 802. Fluids from the fluid inlet 820 flow into the center passageway 890 and through either the first filter media 826 (e.g., flowing along flow path 882) or the second filter media 828 (e.g., flowing along flow path 884) into the inner space 825 and toward the fluid outlet 840.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless specifically noted otherwise, elements shown as integrally formed may be constructed of multiple parts or elements, the position of elements may be reversed or otherwise varied, and the nature or number of discrete elements or positions may be altered or varied. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. A filter assembly comprising:
  a filter housing having a longitudinal axis, the filter housing divided into a first filter chamber and a second filter chamber, the filter housing defining an inlet and an outlet;
  a first filter element comprising a first element top endplate, a first element bottom endplate, and a first filter media positioned between the first element top endplate and the first element bottom endplate;
  a second filter element comprising a second element top endplate, a second element bottom endplate, and a second filter media positioned between the second element top endplate and the second element bottom endplate;

a first aperture formed between the first element top endplate and the second element top endplate;

a second aperture formed between the first element bottom endplate and the second element bottom endplate;

a solid tube positioned between and coupled to the first element top endplate and the second element bottom endplate and separating the first filter chamber from the second filter chamber;

a first passageway formed between the solid tube and the first filter element; and a second passageway formed between the solid tube and the second filter element;

wherein the first element bottom endplate and the second element bottom endplate are formed as a single bottom endplate.

2. The filter assembly of claim 1, wherein:

the inlet provides fluid communication between an engine component positioned outside the filter housing and the first filter chamber;

the outlet provides fluid communication between the second filter chamber and the inlet via the first filter element and the second filter element;

a first portion of the fluid flows from the inlet into the first filter chamber, into the second passageway, radially inward through the second filter element, and exits the filter housing through the outlet; and a second portion of the fluid flows from the inlet into the first filter chamber, through the first filter element, into the first passageway, and exits the filter housing through the outlet.

3. The filter assembly of claim 1, further comprising an axial seal member positioned axially between the second element top endplate and the filter housing, the axial seal member and the solid tube dividing the filter housing into the first filter chamber and the second filter chamber.

4. The filter assembly of claim 3, wherein the first element bottom endplate extends radially across the filter housing and is positioned axially underneath the second element bottom endplate.

5. The filter assembly of claim 1, further comprising an axial seal member positioned between the second element top endplate and the filter housing; and a radial seal member positioned radially between the single bottom endplate and the filter housing, the axial seal member, the radial seal member, and the solid tube dividing the filter housing into the first filter chamber and the second filter chamber.

6. The filter assembly of claim 1, wherein the first filter element and the second filter element are integrated into a single combined filter insert configured to be installed and used within the filter housing.

7. The filter assembly of claim 1, wherein the first element top endplate and the second element top endplate are formed as a single top endplate.

* * * * *